3,553,825
METHOD OF BONDING ALUMINUM

Kostas F. Dockus, Cicero, and John L. Zambrow, Deerfield, Ill., assignors to Borg-Warner Corporation, Chicago, Ill., a corporation of Illinois
No Drawing. Continuation-in-part of application Ser. No. 751,659, July 11, 1968, which is a continuation of application Ser. No. 533,876, Mar. 14, 1966. This application Nov. 6, 1969, Ser. No. 874,689
Int. Cl. B23k 31/02
U.S. Cl. 29—487     6 Claims

ABSTRACT OF THE DISCLOSURE

A method of bonding fragile aluminum parts either to themselves or to other metals by placing a clad surface of conventional alloy on the aluminum part, a bond promoting metal of iron or arsenic and placing the parts to be joined together at a sufficiently high temperature to cause melting and flowing of the clad surface to thereby bond the components to each other. The method does not require pressure and the joining of the parts is accomplished in an inert atmosphere.

---

This application is a continuation-in-part of our copending application Ser. No. 751,659, filed July 11, 1968, now Pat. No. 3,482,305, which was a continuation of a copending application Ser. No. 533,876, filed Mar. 14, 1966, and now abandoned.

This invention relates to a method of bonding aluminum and more particularly to a method of bonding aluminum in the absence of a corrosive flux.

Prior to this invention, fragile aluminum parts such as those making up heat exchangers, electrical terminals, commutator segments and the like were normally bonded either to themselves or to other materials by brazing or soldering as opposed to bonding by solid state diffusion. Brazing or soldering of these materials was necessary due to the fragile nature of the thin aluminum components and the danger of crushing through application of pressure. The brazing or soldering was normally accomplished by first preparing the aluminum surface with a fairly corrosive flux or cleaning material and thereafter causing the brazing metal to flow between the two surfaces to be bonded together. The flux or fusion promoting materials were normally applied either separately or as an integral component of the brazing material. Such joining methods were economical and yielded sound joints, but it was virtually impossible to prevent the entrapment of flux which was generally a necessary ingredient in the process. The entrapped flux often led to premature failure of the structure by corrosion, especially when extremely thin parts were bonded together. It was not possible to bond by methods such as solid state diffusion due to the necessity of utilizing high pressures which tended to crush the very fragile, thin aluminum parts.

It has been desired to provide a method of bonding aluminum sheeting and aluminum parts either to themselves or to other metals by using well known and accepted alloys, such as aluminum-silicon, without utilization of oxide removing fluxes for preparing the surface prior to or during bonding.

Generally stated, the present invention is directed to a method of bonding aluminum parts either to themselves or to other metals, without using a flux, by providing the aluminum parts with a clad surface of conventional alloy, such as aluminum-silicon incorporating a bond-promoting metal, such as iron or arsenic, and thereafter bonding the parts together. The bond promoting alloy is coated on the clad surface. Alternatively, a thin sheet (shim) of metal bonding alloy may be coated with the bond promoting alloy and placed between the aluminum parts to be joined. The aluminum-clad mating portions are placed in contact with each other, or in contact with the thin shim if one is used, in an inert atmosphere at a sufficiently high temperature to cause melting and flowing of the metal cladding (containing the bond promoting metal) on the bonding portion of the aluminum parts to thereby bond the components to each other. The bond promoting coating reacts with the metal cladding causing the resultant alloy to wet the joint and flow into the voids in the interface and form smooth fillets at the surface intersections.

In accordance with this invention, from about 0.1 to about 30 percent of a bond promoting metal is coated on that portion of the aluminum part that is clad with alloy or alternatively on the alloy shim if one is used. The clad part is heated to about 100° F. below its melting point and thereafter very quickly increased to the melting temperature of the alloy. The temperature 100° F. below the melting temperature is normally in the range of 1000° F. This temperature increase takes place within from about ten seconds to sixty minutes and preferably within two minutes. The temperature is retained at the melting point (approximately 1100° F.) for a very short period of time, no greater than two minutes, to allow flow to occur between the joints and the bonded part is thereafter cooled to about 100° F. below the melting point in from about five seconds to five minutes and preferably within two minutes. The heating, bonding and cooling is accomplished within the confines of an inert atmosphere. By inert, it is meant an atmosphere containing no gaseous materials that have a detrimental effect on the bonding action. It has been found that atmospheres such as argon, nitrogen and hydrogen do not interfere with this bonding action. It has also been found that the bonding may take place in an atmosphere containing substantially no oxygen, such as a vacuum.

The bond promoting metal, when coated on the aluminum parts to be joined, is ordinarily of the thickness of about one-hundredth of the thickness of the clad alloy on the aluminum parts or alternatively about one-hundredth of the thickness of the bonding alloy shim, if one is used. When bonding takes place, the bond promoting metal reacts with and becomes part of the bonding alloy to promote wetting of the aluminum parts as well as flow of the allow into the joints formed by the two aluminum parts that are joined together.

Utilizing the conventional aluminum-silicon clad material, the cladding alloy, after the bond is formed, will normally contain up to about 7.5 to 13 percent by weight silicon with aluminum and trace amounts of other metals such as up to about .3 percent by weight copper, up to about 0.8 percent iron, up to 0.2 percent zinc, up to about 0.1 percent magnesium, up to about 0.15 percent manganese, up to about 4.5 percent phosphorus and of course, from about 0.1 to about 30 percent bond promoting metal which is iron or arsenic.

The preferred bond promoting metal utilized in the bonding method of this invention as mentioned, is iron or arsenic.

The bond promoting metal, when applied as a coating, is normally deposited on the clad portion of the aluminum part or the metal shim, as the case may be, by a method such as vacuum deposition, glow discharge, electroless plating, or thermal decomposition. These methods are preferred coating methods because they prevent contaminants from interfering with the bond promoting metal. Once the bond promoting material has been incorporated into the aluminum part or the shim, as the case may be, care should be exercised to maintain the aluminum part or the shim in an oxidation free atmosphere until such time as the bonding step is accomplished. This can be accomplished by enclosing the materials in an oxygen-free atmosphere or simply using the materials in the bonding step before the parts have time to oxidize.

The heating atmosphere in which the bonding may take place may be any suitable furnace which contains an atmosphere having a dew point of no greater than $-30°$ F. and preferably a dew point of $-70°$ F. The furnace may also, as mentioned, have means for evacuating all gas from the furnace i.e., a vacuum.

The following examples are set forth to illustrate the method of this invention, however, they should not be taken as limiting the invention to the details disclosed. In each of the examples, specific temperatures were used as well as specific atmospheres and this is not meant to limit that aspect of the method, but merely for illustrative purposes.

EXAMPLE 1

Two aluminum parts were bonded together by the method of this invention utilizing shim stock on those portions desired to be joined. The shim stock was aluminum—10 percent silicon alloy, 0.005 inch thick. The shim stock was provided with a protective metal coating of iron 30–50 microinches thick. The shim was placed between the two aluminum parts. The iron cladded shim was inspected and it was determined the iron cladding was free of oxidation and the assembly was placed in a furnace having a nitrogen atmosphere with a dew point of about $-40°$ F. The assembly was preheated to 950° F. within a period of about two minutes and thereafter to 1155° F. within 1½ minutes. The assembly was held at 1155° F. for 1½ minutes. The heater on the furnace was turned off and the assembly was cooled to 1000° F. within two minutes and removed from the furnace.

EXAMPLE 2

Two aluminum parts were placed in contact with each other and bonded in accordance with the method of this invention. The shim stock (aluminum—10 percent silicon alloy) was provided with an arsenic coating 30–50 microinches thick. Immediately following the coating step, the parts and coated shim stock were assembled and the assembly was placed in a furnace. The assembly was heated to a temperature of 1000° F. within a period of two minutes. The assembly was thereafter heated to 1140° F. within two minutes and held at this temperature for approximately ½ minute. The atmosphere of the heating chamber was nitrogen gas having a dew point of $-70°$ F. The atmosphere was cooled from 1140° F. to about 1000° F. in about two minutes and the assembly was removed from the furnace atmosphere.

It will be understood that this invention has been described in connection with certain specific embodiments to illustrate the method of the invention. These examples are not meant to be limiting and the scope of the invention is defined solely by the appended claims which should be construed as broadly as is consistent with the prior art.

What is claimed is:
1. A fluxless method of bonding first and second aluminum parts to each other comprising the steps of: providing a shim of aluminum-silicon brazing alloy; coating said shim with a bond promoting metal selected from the group consisting of iron and arsenic; maintaining said shim substantially free of oxidation products; interposing said coated shim between the aluminum parts within the confines of an inert atmosphere having a dew point no greater than $-30°$ F.; increasing the temperature of said inert atmosphere to a temperature of about 100° F. below the melting point of said brazing alloy and bond promoting metal and thereafter increasing the temperature to the melting point of said brazing alloy and bond promoting metal to thereby cause fusion of the brazing alloy and bond promoting metal to bond the parts together; cooling said aluminum parts to about 100° F. below the melting point of said brazing alloy and bond promoting metal and removing said aluminum parts from said atmosphere.

2. A fluxless method of bonding first and second aluminum parts to each other comprising the steps of: providing an aluminum-silicon brazing alloy; cladding at least one of said aluminum parts with said aluminum-silicon brazing alloy; coating said aluminum-silicon brazing alloy with a bond promoting metal selected from the group consisting of iron and arsenic; maintaining said bond promoting metal substantially free of oxidation products; placing said first aluminum part in contact with said second aluminum part within the confines of an inert atmosphere having a dew point no greater than $-30°$ F.; increasing the temperature of said inert atmosphere to a temperature of about 100° F. below the melting point of said brazing alloy and bond promoting metal and thereafter increasing the temperature to the melting point of said brazing alloy and bond promoting metal to thereby cause fusion of the brazing alloy and bond promoting metal to bond the two parts together; cooling said aluminum parts to about 100° F. below the melting point of said brazing alloy and bond promoting metal and removing said aluminum parts from said atmosphere.

3. The method of claim 1, wherein said brazing metal alloy combined with said bond promoting metal contains at least 7½ to 13 percent by weight silicon, up to 0.3 percent by weight copper, up to 0.2 percent zinc, up to 0.1 percent magnesium, up to 0.15 percent manganese, up to 4.5 percent phosphorous and from about 0.1 to about 30 percent of a metal selected from the group consisting of iron and arsenic and the remainder aluminum.

4. The method of claim 1, wherein bonding takes place in the presence of an inert atmosphere selected from the group consisting of nitrogen, argon, hydrogen, helium and a vacuum.

5. The method of claim 2, wherein said brazing metal alloy combined with said bond promoting metal contains at least 7½ to 13 percent by weight silicon, up to 0.3 percent by weight copper, up to 0.2 percent zinc, up to 0.1 percent magnesium, up to 0.15 percent manganese, up to 4.5 percent phosphorous and from about 0.1 to about 30 percent of a metal selected from the group consisting of iron and arsenic and the remainder aluminum.

6. The method of claim 2, wherein bonding takes place in the presence of an inert atmosphere selected from the group consisting of nitrogen, argon, hydrogen, helium and a vacuum.

References Cited

UNITED STATES PATENTS

| | | | |
|---|---|---|---|
| 2,795,040 | 6/1957 | Antel | 29—503X |
| 2,837,450 | 6/1958 | Moore | 29—504X |
| 2,837,818 | 6/1958 | Storchheim | 29—504X |
| 2,907,105 | 10/1959 | Ohmi | 29—504X |
| 2,916,815 | 12/1959 | Donkervoort | 29—504 |
| 2,987,816 | 6/1961 | Noland | 29—504X |

(Other references on following page)

| | | | |
|---|---|---|---|
| 3,063,145 | 11/1962 | Bouton | 29—503X |
| 3,081,534 | 3/1963 | Bredzs | 29—494 |
| 3,083,452 | 4/1963 | Terrill | 29—487 |
| 3,133,348 | 5/1964 | Cape | 29—494 |
| 3,180,022 | 4/1965 | Briggs | 29—504X |
| 3,235,959 | 2/1966 | Bartoszak | 29—501X |
| 3,242,565 | 3/1966 | North | 29—504X |
| 3,321,828 | 5/1967 | Miller | 29—488 |
| 3,322,517 | 5/1967 | Miller | 29—197.5 |
| 3,373,483 | 3/1968 | Miller | 75—148X |
| 3,375,570 | 4/1968 | Dubusker et al. | 29—504X |
| 3,378,914 | 4/1968 | Miller | 29—197.5X |
| 3,391,446 | 7/1968 | Buttle | 29—504X |
| 3,393,446 | 7/1968 | Hughes et al. | 29—501X |
| 3,393,447 | 7/1968 | Paul | 29—197.5X |
| 3,395,001 | 7/1968 | Stroup et al. | 29—504X |

FOREIGN PATENTS

| | | | |
|---|---|---|---|
| 1,121,428 | 1/1962 | Germany | 29—504 |
| 1,125,737 | 3/1962 | Germany | 29—504 |
| 12,834 | 1963 | Japan. | |

JOHN F. CAMPBELL, Primary Examiner

R. J. SHORE, Assistant Examiner

U.S. Cl. X.R.

29—197.5, 492, 494, 498, 502, 504